United States Patent [19]

Kresge

[11] 4,046,847

[45] Sept. 6, 1977

[54] PROCESS FOR IMPROVING THE STABILITY OF SINTERED ZINC OXIDE VARISTORS

[75] Inventor: James S. Kresge, Pittsfield, Mass.

[73] Assignee: General Electric Company

[21] Appl. No.: 643,541

[22] Filed: Dec. 22, 1975

[51] Int. Cl.[2] .......................... H01B 1/08; C01G 9/02

[52] U.S. Cl. ........................................ 264/61; 264/66; 252/518; 423/622

[58] Field of Search ................. 264/61, DIG. 25, 346, 264/348, 56, 66; 252/518 A, 518.3; 423/622

[56] References Cited

U.S. PATENT DOCUMENTS 3,867,145 2/1975 Honjo et al. .................... 252/518 A 3,959,543 5/1976 Ellis ................................ 252/518 A

*Primary Examiner*—Robert F. White
*Assistant Examiner*—John Parrish
*Attorney, Agent, or Firm*—Francis X. Doyle

[57] ABSTRACT

A process for making overvoltage surge protection varistors of the zinc oxide type includes the steps of:

a. sintering a varistor body at an elevated temperature of at least about 1100° C; then
b. cooling the body to a temperature below about 400° C; then
c. reheating the body to a temperature below about 700° C; then
d. recooling the body slowly to a temperature below about 400° C; and then
e. repeating at least once the steps (c) and (d)

for improving the current stability of the varistor under alternating voltage stresses while preserving the level of current leakage through the varistor.

5 Claims, 3 Drawing Figures

PROCESS FOR IMPROVING THE STABILITY OF SINTERED ZINC OXIDE VARISTORS

BACKGROUND OF THE INVENTION

The present invention relates generally to processes for manufacturing sintered varistors which are composed primarily of zinc oxide, and pertains particularly to heat treating of such varistors after they are sintered.

Zinc oxide varistors are highly non-linear and are especially suitable for overvoltage protection devices, such as overvoltage surge or lightning arresters. They contain mostly zinc oxide with certain selected additives for controlling the mechanical and electrical characteristics of the varistor. The varistors are generally in the form of rods or discs which are provided with metal electrode layers on the end faces.

The manufacturing process for zinc oxide varistors includes pressing a powder mixture of zinc oxide and the desired additives in a die to form a self-supporting body. Then the body is sintered in a furnace at about 1200° C (Celsius) for a time until a non-porous ceramic is formed, and is then cooled and provided with metal electrodes.

While as yet the mode of operation of zinc oxide varistors is not fully understood, a number of parameters in the manufacturing process are known to have a significant, and in some cases critical, effect on the electrical characteristics of the finished varistor. Two electrical characteristics of special importance for arrester varistors are exponent and stability. The term "exponent" as used herein refers to the value of the current-voltage characteristic exponent n of the voltage V in the current-voltage relationship $I=KV^n$ for a resistor, where I represents the current through the resistor and K represents a constant. The term "stability" as used herein refers to extent to which the constant K remains constant when the varistor is subjected for an extended time to an applied voltage low enough to prevent heat damage to the varistor by the leakage current.

Efforts to control the exponent of zinc oxide varistors by selecting the appropriate additives and sintering conditions have met with considerable success. Efforts to develop a stable varistor for use at high voltages have met with more limited success. It is known that the leakage current through a given zinc oxide varistor can be made more stable by subjecting it to an additional reheating cycle after it has been sintered. The reheating cycle involves a reheating to about 700° C for about two hours and removal from the furnace for rapid cooling in room ambient.

While the above reheating cycle does result in varistors with a more stable leakage current, it unfortunately leaves them with a leakage current of much greater magnitude for a given voltage than was exhibited by them prior to the reheating. Thus, in a sense it appears to simply accelerate a time-dependent increase of leakage current which characterizes long term varistor instability. Such increased leakage current makes the varistors unacceptable for high voltage surge arrester use without the additional provision of series gaps, because it will result in excessive heating of the varistors at the normal operating voltages with subsequent degradation of their other characteristics.

SUMMARY OF THE INVENTION

The novel process for making a varistor of the zinc oxide type includes, after sintering and cooling, the steps of reheating to a temperature above 400° C but below 700° C, recooling slowly to below about 400° C, and then repeating at least once such reheating and slow recooling.

Varistors made in accordance with the above normal process are found to have a greatly increased stability without suffering a substantial increase in their leakage current, and are therefore especially suitable for high voltage arrester use.

DESCRIPTION OF THE PREFERRED EMBODIMENT

Figure 1:
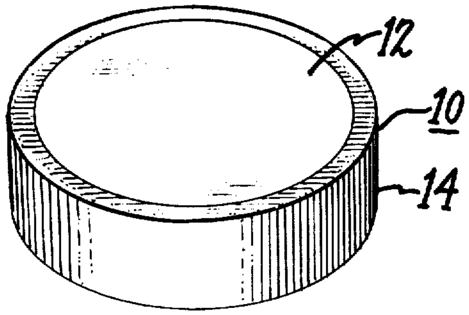
FIG. 1 is an elevational view of a varistor in accordance with the preferred embodiment of the invention.

A preferred embodiment of the invention is the varistor disc 10 of FIG. 1. The disc 10 is about 6.9 cm (centimeters) in diameter and about 2.25 cm thick. It is pressed from a powder having the following composition, in mole percent:

| | | |
|---|---|---|
| 95.7% | $ZnO$ | (zinc oxide) |
| 0.5% | $Bi_2O_3$ | (bismuth trioxide) |
| 0.5% | $Co_2O_3$ | (cobalt trioxide) |
| 0.5% | $MnO_2$ | (manganese dioxide) |
| 1.0% | $Sb_2O_3$ | (antimony trioxide) |
| 0.5% | $Cr_2O_3$ | (chromic oxide) |
| 0.1% | $BaCO_3$ | (barium carbonate) |
| 0.1% | $B_2O_3$ | (boron oxide) |
| 0.1% | $SiO_2$ | (silicon dioxide) |
| 1.0% | $NiO$ | (nickel oxide) |
| 0.003% | $Al(NO_3)_3.9H_2O$ | (aluminum nitrate) |

The disc 10 is now sintered at 1200° C for 5 hours in air. At the end of the sintering time, the disc 10 is cooled slowly, at a rate of about 100° C per hour by, for example, leaving it in the cooling furnace. When it has cooled to a temperature of about 400° C or less, aluminum is flame sprayed on the faces to form electrodes 12, only one of which is shown in FIG. 1. Next, the disc 10 is reheated in a furnace at 580° C in air for one hour and again slowly cooled at 400° C or less at an average rate of for example 100° C per hour. The reheating cycle to 580° C and slow cooling is repeated at least once, preferably several times. The disc 10 is now stable with a low leakage current and may be incorporated into an overvoltage surge arrester either alone or as one of a number of arrester valve discs.

Certain variations in the reheating cycles may be made for accommodating additional structure. For instance, a low temperature curing insulating ceramic slurry may be coated on the peripheral surface 14 of the disc 10 prior to one of the reheating cycles so that it will set in the course of the reheating to form a flashover preventive collar. One particularly suitable slurry for this purpose is a water-based one containing a dry weight ingredient unit of filler-clay mix, of which 80% is mullite (100F) and 20% is Florida kaolin (air floated). The filler-clay mix is combined with 10% of such a dry weight unit of inorganic binder consisting of equal weights of monoaluminum phosphate and concentrated phosphoric acid. This combination is slurried with about 60% dry weight unit of water as a vehicle. With the disc 10 at a temperature of about 120° C, the slurry is applied by spraying to a thickness of about ¼ millimeter. The slurry will cure, or set to form a ceramic at anywhere above about 250° C, depending upon the time at that temperature. A temperature above 400° C requires no more than about 45 minutes for setting to take place. Thus, if the reheating cycle is reheating to over 400° C for about an hour with slow cooling, simultaneous setting of the collar is assured. It has been found, however, at least for heat treating times of about one hour, that the simultaneous setting of a ceramic collar during the reheating cycle appears to lessen considerably the degree of stability improvement. The reason for the lessened improvement are not clear, but it is conjectured that the setting process may affect heat transfer from the furnace to the disc 10 in a manner which prevents the disc 10 from reaching the proper final temperature. It may well be that a somewhat longer time period for heating is appropriate for a disc with a setting collar.

Since the flame spraying application of the electrodes 12 does not involve bulk heating of the disc 10, such application may be made at any convenient stage of manufacture of the disc 10 after it has been sintered.

GENERAL CONSIDERATIONS

The precise nature of the phenomena responsible for the improved stability which results from the practicing of the present invention is not presently understood. Prior art single cycle reheating to about 700° C and fast quenching as discussed above, which resulted in improved stability accompanied by greatly increased leakage current, was undertaken on the basis of suspected phase change in the bismuth oxide constituent of the varistor. It was postulated that by reheating to about 700° C, a particular desirable phase of the bismuth oxide present in the grain boundry layer between zinc oxide crystals would be established. Since such temperature related phase changes are generally reversible phenomena, such postulation would discourage those in the art from repeating such a reheating cycle after the first one.

The present inventor has found, however, that a reheating cycle in accordance with the present invention with a slow cooling continues to improve stability when it is repeated several times. Indeed, a single reheating cycle alone is not sufficient for a satisfactory high voltage varistor. Repeated reheating cycles do not increase significantly the leakage current.

Despite the fact that the phenomena associated with the reheating cycles of the present invention are not fully understood, some empirical studies carried out by the present inventor, when taken together with other known information, have permitted some tentative but useful general observations to be made.

One observation is that prior to each reheating after the sintering, the varistor must be cooled to about 400° C or below.

Another observation is that the reheating temperature for a varistor of the general size of that of the preferred embodiment may be in the range of from 400° C to about 650° C, with the lower temperatures requiring a longer cycling time and the higher temperatures requiring on the order of about one hour, enough time to ensure that all parts of the varistor have reached the furnace temperature. There is some reason to suspect that smaller varistor pieces would require a temperature near the lower end of the range and a shorter cycling time than larger pieces.

A third observation is that the optimum temperature for the reheating of a varistor generally equal in size to the disc 10 of the preferred embodiment is about 580° C.

A fourth observation is that the rate of cooling the varistor after the reheating can to some extent affect the degree of improved stability. A quenching in room temperature air of a disc of the general size of the disc 10 of the preferred embodiment appears to be too rapid for optimum results. However, the rate does not seem to be particularly critical at rates slower than room temperature quenching. There are indications that smaller size varistors may be less affected by faster cooling rates than are larger ones.

A fifth observation is that the stability of the varistor appears to continue to improve with more reheating cycles, the degree of improvement being most pronounced with the first several.

A sixth observation is that the process in accordance with the present invention is effective for improving the stability of most, if not all, varistors with a composition of primarily zinc oxide.

The information leading to the above observations includes a number of trials with different varistor samples. Some of these trials are discussed below. Each trial was begun with two sample discs of the same composition, dimensions, and history as the disc 10 of the preferred embodiment prior to any reheating. The discs had been sintered, slowly cooled to room temperature, and then flame sprayed with aluminum to form electrodes on the faces. The discs were then tested for their initial leakage current by measuring the watt loss at an applied 60 herz potential equal to that of the anticipated operating conditions. The watt loss is chosen as representative of the leakage current because it is a function of the resistive component of current only, and is not influenced by the capacitive component of current, which is considerable at that voltage level. Thereafter the two samples were subjected together to the same trial processes and their watt loss measured again at the same applied voltage for an extended time. To obtain test results in a reasonable period of time, the tests are made at an elevated temperature such as 115° or 80° C. By making tests at several temperatures, the result which would be obtained at normal operating temperatures can be deduced. The change in the watt loss over the extended time was plotted on a graph as a curve to show the average stability characteristic for the two discs. Data from such sample pairs of discs did not vary significantly as between the individuals of the pair.

Figure 2:
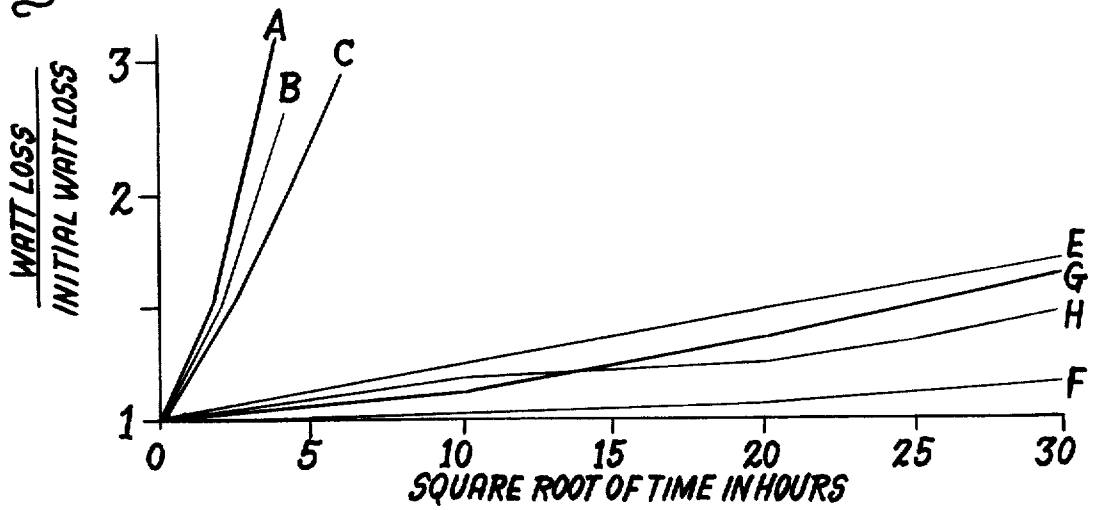
FIG. 2 is a graphical representation of the stability of a number of trial sample varistors.
Figure 3:
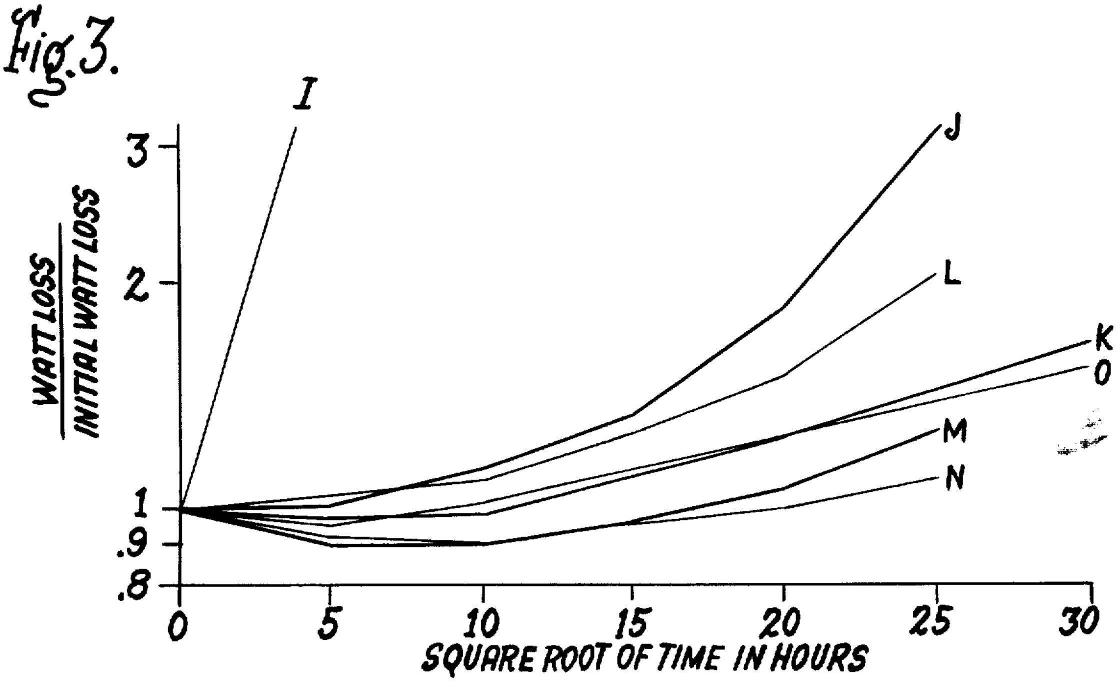
FIG. 3 is a graphical representation of the stability of a number of additional trial sample varistors.

Stability curves for the trial samples are shown in the logarithmic graphs of FIGS. 2 and 3, in which the ordinate represents the normalized watt loss, the ratio of the instant watts loss W to the initial watts loss $W_o$. The abscissa represents the square root of the stability test time hours.

The time period of the reheatings was chosen for most of the trials to be one hour, since such a period was thought to assure that all portions of the bulk would reach the ambient furnace temperature.

All trials with the exception of trial K, which involved a pure oxygen ambient, were done in an air ambient. The air is a sufficiently oxidizing ambient to prevent reduction of the disc material.

Trial A

Samples A were tested for stability with no further processing. The stability curve A of FIG. 2 shows the samples to have poor stability, with the watt loss more than tripling in less than 25 hours.

Trial B

Samples B were reheated for one hour to 400° C and slowly recooled to room temperature. The stability was slightly improved, as shown by the curve B of FIG. 2.

Trial C

Samples C were treated as were samples B and then reheated again for one hour to 400° C and slowly recooled to room temperature. This resulted in a further slight improvement in stability, as is seen from curve C of FIG. 2.

Trial E

Samples E were reheated for one hour to 580° C and slowly recooled to room temperature. The curve E of FIG. 2 shows a much improved stability, with the watts loss being not even doubled over a 900 hour period.

Trial F

Samples F were treated as were samples E and then reheated again for one hour to 580° C and slowly recooled to room temperature. Curve F of FIG. 2 shows a significantly improved stability even over that of samples E.

Trial G

Samples G were reheated for one hour to 650° C and slowly recooled to room temperature. Curve G of FIG. 2 shows greatly improved stability.

Trial H

Samples H were treated as were samples G and then again reheated for one hour to 650° C and recooled slowly. Curve H of FIG. 2 shows that the stability is improved to a lesser degree than it was for samples F, which were twice reheated to 580° C.

Trial I

Samples I had a coating of uncured ceramic collar material applied to the peripheral surface and then dried, with the discs heated to about 120° C to facilitate the drying. They were then reheated to 580° C and slowly recooled to room temperature. Their stability curve I of FIG. 3 shows, when compared to curve E, that the setting of the collar during the reheating appears to affect unfavorably the degree to which the stability is improved by the reheating cycle of that temperature and duration. This effect is thought likely due to thermal phenomena and subject to elimination by readjustment of reheating parameters.

Trial J

Samples J were treated as were samples I and then again reheated for one hour to 580° C and slowly recooled to room temperature. Stability curve J of FIG. 3 shows that the reheating again after the collar is set results in a marked stability improvement.

Trial K

Samples K were treated as were samples I and then again reheated at 580° C in a pure oxygen ambient for 7.5 hours. Curve K of FIG. 3 shows further stability improvement over that of the samples J, which were reheated in air for a shorter time of one hour but to the same temperature.

Trial L

Samples L were treated as were samples I. Then an uncured collar coating was applied at 120° C and the discs were reheated for one hour at 580° C and slowly recooled, thus setting the collar in the process. As shown by the curve L of FIG. 3, the degree of stability improvement from the second reheating is somewhat less than would be expected, due to the simultaneous setting of the collar ceramic.

Trial M

Samples M were reheated once for one hour at 650° C and slowly recooled. Then an uncured collar coating was applied at 120° C and the discs were reheated for one hour at 580° C and slowly recooled. The stability is shown by curve M of FIG. 3.

Trial N

Samples N were first provided with an uncured ceramic collar coating at 120° C. Then they were reheated for one hour to 400° C and slowly recooled. Then they were cycled through five reheatings, being slowly recooled to below 400° C after each reheating and being reheated for one hour each to 630° C, 600° C, 570° C, 540° C, and 510° C in that order. Stability curve N shows the samples N to have a particularly high degree of stability.

Trial O

Samples O also were provided with an uncured ceramic collar coating at 120° C. Thereafter they were reheated first for one hour at 650° C and slowly recooled, then again reheated for one hour to 570° C and slowly recooled. The curve O of FIG. 3 shows the stability to be improved to a somewhat lesser degree than that of samples N.

It appears that at least for varistors of the composition and configuration as the disc 10 of the preferred embodiment, the greatest stability is attained by reheating to a temperature of about 580° C and that recooling, and repeating such a reheating cycle as many times as is feasible in the manufacturing process.

I claim:

1. A process for making a varistor body of the zinc oxide type, comprising the steps of:

a. sintering the body at an elevated temperature of at least about 1100° C; then
b. cooling the body to a temperature below about 400° C; then
c. reheating the body to a temperature above 400° C but below 700° C; then
d. recooling the body slowly to a temperature below about 400° C, and then
e. repeating at least once the sequence of the reheating step (c) and then recooling step (d).

2. The process of claim 1 and wherein said reheating is to between about 550° C and about 630° C.

3. The process of claim 2 and wherein said reheating is by placing the varistor for about one hour inside a furnace which is held at said reheating temperature.

4. The process of claim 3 and wherein said reheatings are to substantially the same reheating temperatures.

5. The process of claim 4 and wherein said recoolings are at an average rate of about 100° C per hour for about the first hour.

* * * * *